UNITED STATES PATENT OFFICE.

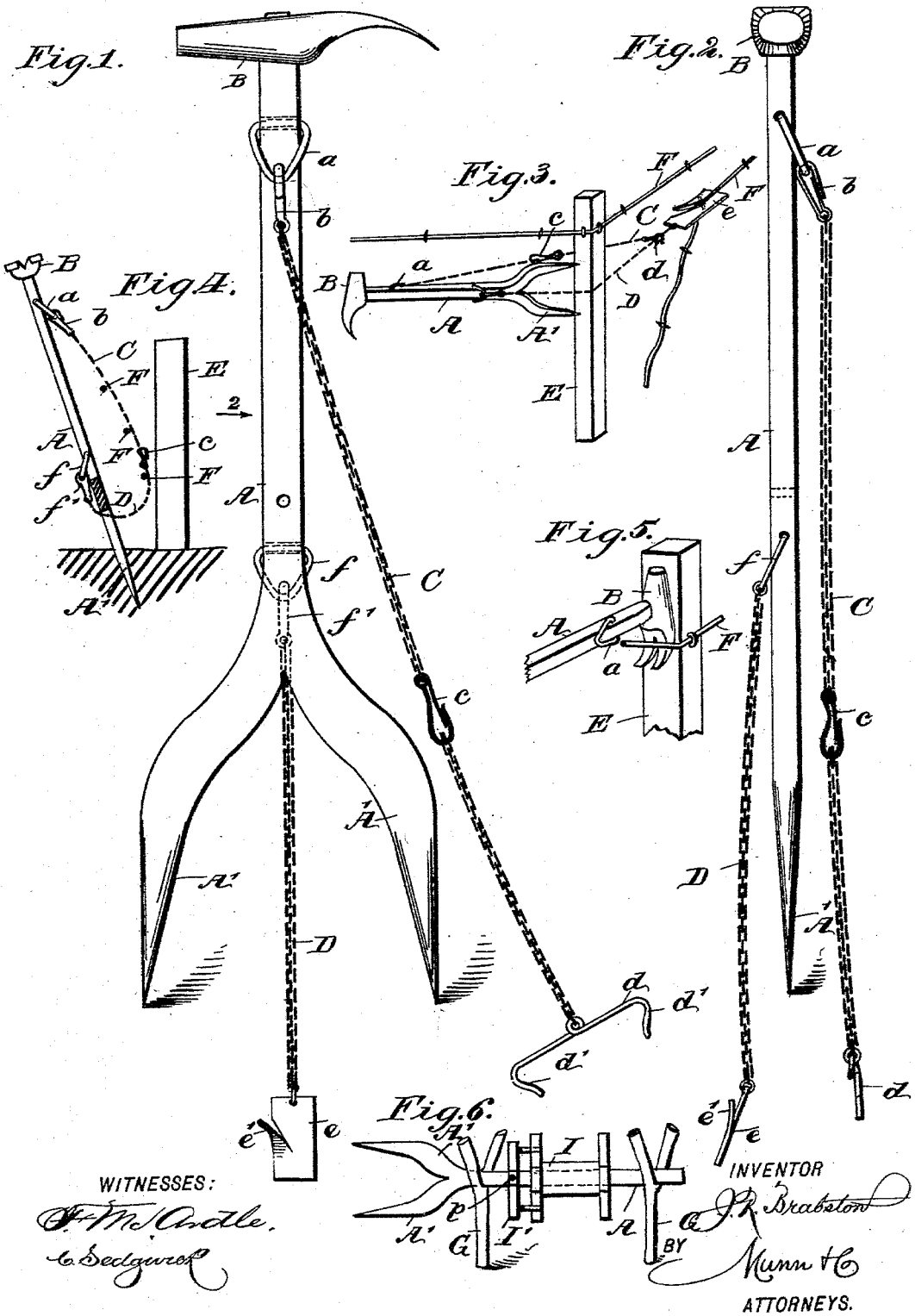

JOHN R. BRABSTON, OF NEW BELL, MISSISSIPPI.

WIRE STRETCHER AND HOLDER.

SPECIFICATION forming part of Letters Patent No. 511,112, dated December 19, 1893.

Application filed May 16, 1893. Serial No. 474,402. (No model.)

*To all whom it may concern:*

Be it known that I, JOHN R. BRABSTON, of New Bell, in the county of Warren and State of Mississippi, have invented a new and useful Improvement in Wire Stretchers and Holders, of which the following is a full, clear, and exact description.

This invention relates to improvements in a device for stretching fence wire, and holding it taut while the wire is being secured upon a post, and has for its objects to provide a novel, simple and practical implement of the type indicated, which will afford reliable and convenient means to stretch a wire taut at a post, hold loosened wires in position while an insecure post is removed, so that the set of fence wires may be replaced upon a new post when erected and engage said post in a stretched condition, and also be adapted for service as a tool to expeditiously remove fence wire from posts, and serve as a reel shaft when old fence wire is to be reeled for re-use.

To these ends, my invention consists in the construction and combination of parts, as are hereinafter described and claimed.

Reference is to be had to the accompanying drawings forming a part of this specification, in which similar letters of reference indicate corresponding parts in all the figures.

Figure 1 is a perspective view of the implement. Fig. 2 is a side view opposite the arrow 2, in Fig. 1. Fig. 3 is a view of the implement applied to a fence wire to stretch it toward a fence post. Fig. 4 shows the implement in use to sustain several fence wires that have been detached from a fence post. Fig. 5 is a partial perspective view of the improvement, applied to a post and fence wire secured thereon, for the removal of the fence wire; and Fig. 6 represents the implement in position as a reel support.

There is a handle bar A, of a proper length and thickness provided, which bar is forked at the end that is lowermost in use, and each limb A' of said fork is tapered to a sharp point so as to adapt the device for an easy insertion in the soil. On the opposite end of the bar A, from the fork limbs A', a claw hammer head B, is affixed at right angles to the bar and in the same plane with the fork limbs.

A chain C, is loosely secured to the handle bar A, near the hammer head B, preferably by a shackle loop $a$, and a snap hook $b$ that engages the loop.

The chain C, is made separable between its ends, by the introduction of a snap hook $c$, which is secured to one end of the chain section where it is to join the other section, which is effected by the snap hook, that may engage loosely and detachably any desired link of the chain portion which is to be joined to the piece having the hook.

On the free end of the chain C, a hook bar $d$, is loosely secured, which has a ring eye at its center to afford means for its attachment to the chain, and a hook $d'$ on each end, that may be hooked fast to a link in the chain C, or to another chain D.

The chain D, is shackled to the handle bar A, near the furcated limbs of the latter, and may be of less length than the chain C. A snap hook $f'$ may be used to detachably connect the chain D to a ring $f$, on the handle bar. See Fig. 1. On the free end of the chain D, a locking hook $e$ is loosely attached, having a lip $e'$ produced on it by slitting the sheet metal piece that the hook is formed of, diagonally inward and downward, and bending the lip piece laterally, whereby a hook is produced, that is cheap to construct, and well adapted to interlock with a barbed wire strand that may be drawn into the slit mentioned, a barb on the wire preventing the wire from slipping when it reaches the hook plate, as indicated by dotted lines in Fig. 3.

In use, the chain D, is passed around a planted post such as E, and the hook plate $e$, is attached to the wire strand F, which is to be stretched, and which has been drawn as tightly by hand as can be effected. See Fig. 3. The chain C, is then extended on the opposite side of the post, and hooked fast upon the chain D, near the hook plate by one of the hooks $d'$, on the hook bar $d$. The handle bar A, is applied to the post E, its sharp pointed limbs A', resting on the side of said post at a point near the horizontal plane that the fence wire F is to occupy. The handle bar is rocked toward the chain C, which produces draft strain on the chain D, stretching the fence wire F, and slackening the chain C. The snap hook $c$, is now changed in adjustment, so as to take up the slackness of the chain C, and the handle bar A then rocked toward the chain D, still further stretching the fence wire, which will be retained in a taut condition with ease, by the operator pressing his body against the handle bar A, from the side on which the chain C, is secured thereto, that will permit both hands to be used for the affixing of the fence wire to the post by driving a staple over the wire and into the post in the usual manner.

When the posts of a wire fence are rotted away so as to require removal for the substitution of new posts, the barbed wires may be readily removed from the posts by applying the claw of the hammer head B, to the wire as shown in Fig. 5, the insertion of the claw being effected by hitting the pole of the hammer head with another hammer, which will withdraw the staples used to attach the wire strands to the posts and avoid injury to them, allowing their re-use for securing the strands to new posts.

In order to stretch at one time the several barbed wire strands composing a fence, so as to allow a new post at a corner to be planted, or hold the wires away from the fence line if the post is not on a corner, the implement is utilized as shown in Fig. 4. In this event the section of the chain C carrying the hook bar $d$ is removed, and the locking hook $e$ is detached from the chain D, and the chains C and D, are passed around the several wires F, and hooked together by the snap hook $c$. Then the forked end of the handle bar A, is placed on the ground at a proper distance outside of the fence line, and vibrated outwardly while it is pushed into the earth, which will retain the fence wires in the bight of the connected chains, and remove them sufficiently from the post they have been detached from, to permit the latter to be removed, and another post planted in the hole from which the old post was removed, or at one side of it, if preferred.

When a barbed wire fence has been taken down, and the wire strands are to be wrapped upon spools to permit their convenient handling and transportation, as well as their replacement in the erection of another fence, the implement hereinbefore described, may be used to advantage in the construction of a temporary wire reeling device that is shown in Fig. 6. To erect such a wire reeling apparatus, two crotched standards G, are driven into the ground at a point where the device is to be located, and suitably spaced apart. A common reel frame I, is slid upon the handle bar A, and a reel driver I', also. The latter, which is composed of a centrally perforated bar having a laterally projected pin at each end and which engages the arms of the reel frame, is held in place on the handle bar by a bolt, or wooden pin $p$, that is driven through a transverse perforation in the handle bar, and a similar hole in the reel driver. The handle bar, and reel on it, are together placed on the standards G, the bar lying in the forks of the standards, and the reel occupying space between them. When wire is to be reeled on the frame I, the handle bar is rotated by manipulation of the limbs A' which afford crank arms for the bar.

Having thus described my invention, I claim as new and desire to secure by Letters Patent—

1. A wire stretching device, comprising a furcated handle bar, a chain shackled to said bar near its fork, a hook plate on the free end of said chain, another chain in two sections shackled to the handle bar near its opposite end, a snap hook connecting sections of said chain, and a hook on the free end of the outer section of said chain, substantially as described.

2. A wire stretching and removing device, comprising a furcated handle bar, a claw hammer head on the straight end of the bar, a chain shackled to the handle bar near its forked end, a hook plate on the free end of said chain, a second chain composed of two sections and connected by a snap hook, said chain having a hook bar on one end, and shackled at its other end to the handle bar near the hammer head, substantially as described.

JOHN R. BRABSTON.

Witnesses:
JAMES M. GIBSON,
T. J. BILLETT.